(12) United States Patent
Hospital

(10) Patent No.: US 6,701,568 B1
(45) Date of Patent: Mar. 9, 2004

(54) MOTOR VEHICLE WIPER SYSTEM UTILIZING A SLIDE

(75) Inventor: Eric Hospital, Montigny le Bretonneux (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/701,398

(22) PCT Filed: May 27, 1999

(86) PCT No.: PCT/FR99/01249

§ 371 (c)(1),
(2), (4) Date: Nov. 28, 2000

(87) PCT Pub. No.: WO99/61291

PCT Pub. Date: Dec. 2, 1999

(30) Foreign Application Priority Data

May 28, 1998 (FR) .............................................. 98 06725

(51) Int. Cl.⁷ .................................................. B60S 1/06
(52) U.S. Cl. ................................ 15/250.31; 15/250.21; 15/250.29
(58) Field of Search ........................... 15/250.3, 250.31, 15/250.21, 250.29

(56) References Cited

U.S. PATENT DOCUMENTS

| 5,186,064 A | 2/1993 | Matsumoto et al. ........... 74/47 |
| 5,287,771 A | * 2/1994 | Blanchet ..................... 15/250.3 |
| 5,809,610 A | * 9/1998 | Eustache ................. 15/250.21 |

FOREIGN PATENT DOCUMENTS

| FR | 2 740 749 | 5/1997 |
| FR | 2 753 942 | 4/1999 |

* cited by examiner

Primary Examiner—Theresa T. Snider
(74) Attorney, Agent, or Firm—J. Gordon Lewis

(57) ABSTRACT

A wiper driven by a motor-driven drive shaft which has a variably-oriented axis and a guiding section of the drive shaft is held between two surfaces of a slide. One of the slide surfaces is carried by a friction plate whose external surface cooperates with a deformable member interposed between the friction plate and a stationary wall of the slide to permit a displacement of the friction plate along a transverse direction perpendicular to the plane of the plate. The formable member acts on the plate, when the guiding section is held in the slide, such that the guiding section rests simultaneously against the two surfaces of the slide.

18 Claims, 2 Drawing Sheets

MOTOR VEHICLE WIPER SYSTEM UTILIZING A SLIDE

BACKGROUND

The invention relates to a motor vehicle wiper system having an improved slide.

The invention relates more particularly to a motor vehicle wiper system of the type in which a windshield wiper is given a sweeping movement by a drive shaft which is itself made to rotate around its axis by a motor. The wiper system has a means of varying the orientation of the axis of the drive shaft. A guiding section of the shaft is held between two internal surfaces, parallel and facing one another, of a slide.

Such a wiper system is, for example, described in FR-A-2 753 942. The wiper system described in this document therefore has a drive shaft that is mounted so as to be mobile in rotation in a support by the intermediary of a spherical bearing that provides it with three degrees of freedom in rotation. However, in order to limit the range of motion possible for this shaft, it is provided that the lower end of the shaft be held in a slide in such a way that the shaft can no longer rotate except, on the one hand, around its axis, and on the other hand, around an axis containing the center of rotation of the spherical bearing and the longitudinal axis of the slide. The wiper system furthermore has a means making it possible to vary the orientation of the drive shaft around this second axis, particularly as a function of the angular position of the shaft in revolution around its own axis.

In such a system, it is important to be able to eliminate any play between the lower end of the shaft, which forms a guiding section, and the two internal surfaces of the slide, which face one another. In effect, any possibility of impact between the shaft and the slide is thus avoided, which makes it possible to limit the operating noise of the system to a great extent.

However, the shaft cannot be held too tightly inside the slide, under penalty of increasing the friction between the shaft and the slide, which is detrimental, on the one hand, to the efficiency of the mechanism and therefore to the energy consumption necessary to ensure movement, and on the other hand, to a satisfactory working life of the mechanism because of wear and tear due to friction.

SUMMARY

The invention therefore aims to propose a new design of a wiper system which, while making possible operation without jolts, without impact, and therefore without noise, allows better control of the tightness of the guiding section of the shaft within the slide.

For this purpose, the invention proposes a wiper system of the above type characterized by the fact that at least one of the internal surfaces of the slide is formed by a friction plate whose external surface cooperates with deformable means interposed between the friction plate and a stationary wall of the slide in order to permit a displacement of the friction plate along a transverse direction perpendicular to the plane of the plate, and by the fact that when the guiding section is held in the slide, the deformable means act on the plate in such a way that the section rests simultaneously against the two opposite internal surfaces of the slide.

According to other characteristics of the invention:
the deformable means consist of a plate made of elastomeric material whose interior surface rests against the external surface of the plate and whose exterior surface rests against the wall of the slide;
the deformable plate has raised protuberances on at least one of its surfaces;
the raised protuberances are in the form of bars;
the raised protuberances are in the form of wavy bars;
the raised protuberances are in the form of stubs;
the stubs are roughly cylindrical and solid;
the deformable plate has, on its surface opposite that which bears the protuberances, recesses made to correspond with the protuberances;
the protuberances are arranged on the interior surface of the deformable plate;
the protuberances are arranged on the exterior surface of the deformable plate;
the deformable plate is produced by extrusion;
the deformable plate is produced by molding;
the deformable plate is molded onto the friction plate;
the deformable plate is glued to the friction plate;
the deformable plate has, at its two longitudinal ends, caps which extend transversely towards the interior from the interior surface of the plate and each of which delimits a housing, the two housings being open longitudinally in the direction of one another so that each can hold a corresponding longitudinal end of the friction plate;
the slide has two opposite stationary walls, two friction plates, and two deformable elements which are interposed respectively between one of the plates and one of the walls, and the guiding section of the shaft is held tightly between the two friction plates;
the two deformable elements are produced in the form of a dampener block in a single piece; and
the dampener block is molded around the two friction plates.

BRIEF DESCRIPTION OF THE DRAWING

Other characteristics and advantages of the invention will appear upon reading the detailed description which follows, for the comprehension of which reference will be made to appended drawings in which.

DETAILED DESCRIPTION

Figure 1:
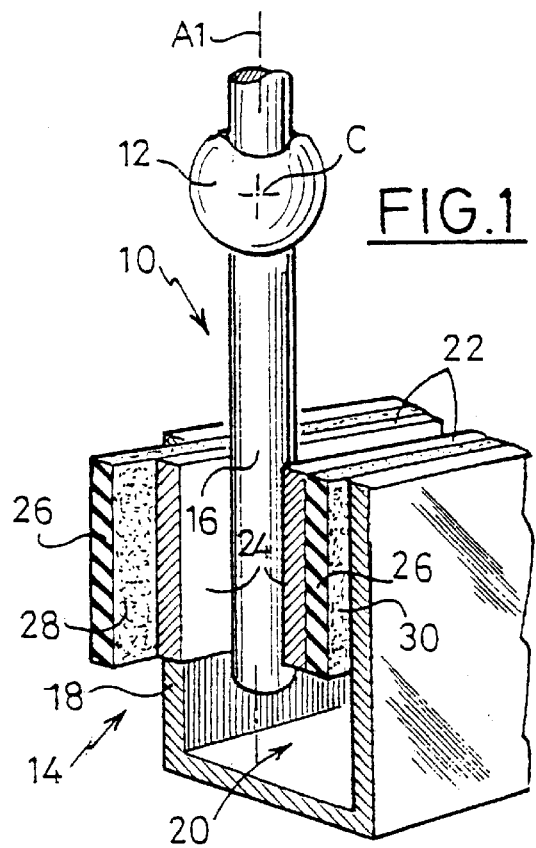
FIG. 1 is a diagrammatic oblique view illustrating in a partial manner a wiper system according to the teaching of the invention.

Illustrated diagrammatically in FIG. 1 is a part of a motor vehicle wiper system. More precisely, we have illustrated windshield wiper drive shaft 10, with axis A1, which is articulated around point C with respect to a support (not represented) by the intermediary of spherical bearing 12. Axis A1 passes through point C, and spherical bearing 12 theoretically gives shaft 10 three degrees of freedom around point C.

In order to limit the range of motion of shaft 10, and particularly in order to eliminate one of its degrees of freedom in rotation about point C, lower end 16 of shaft 10 is held in slide 14 with a longitudinal axis.

Slide 14 has a stationary structural element provided with two walls 18 parallel both to axis A1 and to the longitudinal axis of the slide. The two walls 18 delimit between them space 20 inside of which lower end 16 of shaft 10 is held. According to the teaching of the invention, shaft 10 is received between two friction plates 22 which extend parallel to walls 18, between the two walls.

According to the invention, lower end 16 of shaft 10 is in contact simultaneously with the facing opposite internal surfaces 24 of each of the two plates 22. Thus, end 16 of shaft 10 is immobilized in the transverse direction, and shaft 10 is immobilized in rotation around a longitudinal axis passing through point C.

For this purpose, interposed between each plate 22 and the corresponding wall 18 is deformable element 26 which, since wall 18 is stationary, acts on plate 22 transversely towards the interior. The dimensions of the whole are determined so that when end 16 of shaft 10 is held between friction plates 22, the two deformable elements 26 are compressed between plate 22 and wall 18.

According to a preferred embodiment of the invention, deformable elements 26 are produced in the form of plates made of an elastomer.

Each deformable plate 26 therefore rests by interior surface 28 against friction plate 22, and by exterior surface 30, against an internal surface of the corresponding wall 18.

In the embodiment example illustrated in FIG. 1, the two interior 28 and exterior 30 surfaces of deformable plate 26 are smooth and flat.

Figure 2:
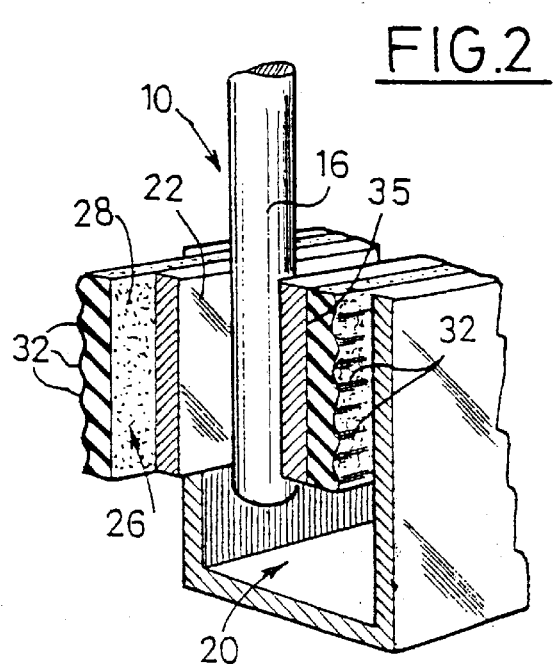
FIG. 2 is a view similar to that of FIG. 1, illustrating an embodiment variant of the invention.
Figure 3:
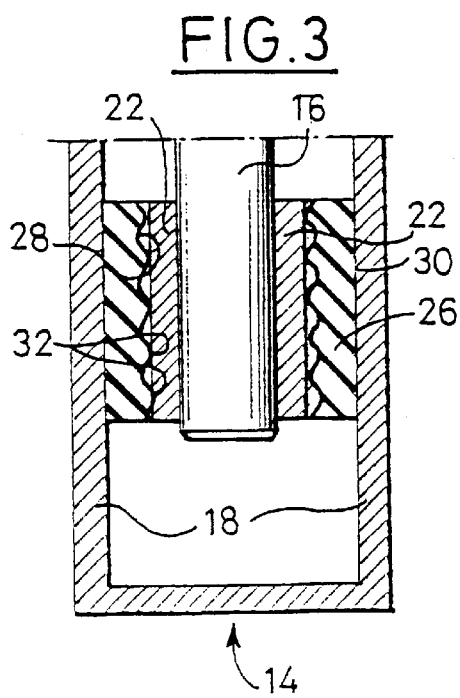
FIG. 3 is a cross section illustrating a variant of the invention.

By contrast, in the embodiment examples of the invention which are illustrated in FIGS. 2 and 3, deformable plates 26 are provided with raised protuberances 32 on at least one of their surfaces 28, 30.

In these two examples, protuberances 32 are produced in the form of longitudinal bars which extend in a rectilinear manner parallel to one another. In the embodiment example of FIG. 2, protuberances 32 are borne by exterior surfaces 30 of each of the two deformable plates 26, whereas in the embodiment example illustrated in FIG. 3, deformable plates 26 are provided with protuberances 32 on their interior surfaces 28 which are in contact with the corresponding friction plate 22. In both cases, deformable plates 26 can, for example, be produced by extrusion and can be connected by gluing to external surface 35 of friction plate 22.

Protuberances 32 make it possible to limit the contact surface between the elastomeric material and the two rigid elements, which particularly permits better control of crushing of plate 26 as a function of the force applied to it by shaft 10 via friction plate 22. Of course, it is possible to provide for arrangement of protuberances on both surfaces 28, 30 of deformable plate 26.

Figure 4:
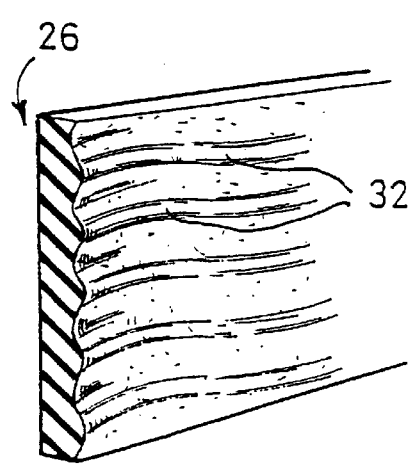
FIG. 4 is a partial view of a deformable plate according to the invention.

In the embodiment example illustrated in FIG. 4, longitudinal bars 32 have a profile which is not rectilinear but rather is wavy, which makes it possible to improve distribution of the forces transmitted between wall 28 and deformable plate 26.

Figure 5:
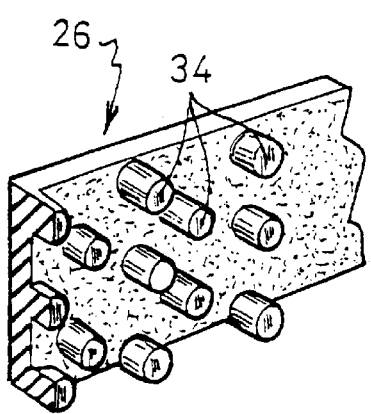
FIGS. 5 and 6 are views similar to those of FIG. 4 illustrating embodiment variants of a deformable plate.

In the embodiment example illustrated in FIG. 5, deformable plate 26 has, on one of its surfaces 28, 30, cylindrical stubs 34 that extend transversely in relief and that are arranged in a staggered manner. In these two last embodiments of the invention, plate 26 can, for example, be produced by molding and attached by gluing to the corresponding friction plate 22. It is also possible to provide for molding of plate 26 on plate 22.

Figure 6:
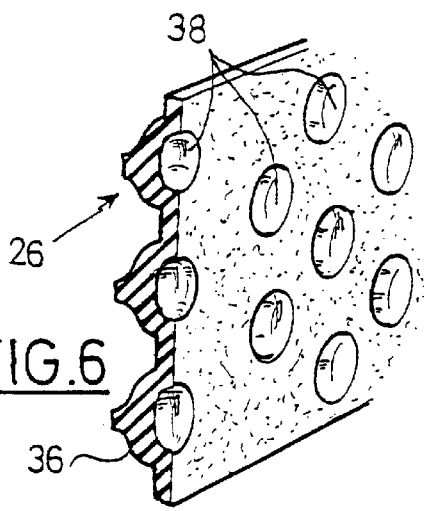

In the example in FIG. 6, plate 26 has stubs 36 whose shape in cross section makes it possible to take best advantage of their resistance to crushing as a function of the force exerted. In effect, on that surface 28, 30 opposite the surface on which stubs 36 are formed in relief, plate 26 has recesses 38 arranged so as to correspond exactly with raised stubs 36 of the other surface. Thanks to these recesses 38, one succeeds in maintaining a relatively constant thickness of material, which simplifies control of crushing of the plate.

Moreover, recesses 38 have roughly the shape of a bowl so that the force to obtain a given transverse crushing of stub 36 is roughly proportional to this crushing.

Of course the invention can also be used with a transversely mobile friction plate provided on only one side of the slide; associated deformable element 26 must then take up all the possible play in order to make it possible to lay the shaft against both the internal surface of the opposite wall and the internal surface of the friction plate.

Figure 7:
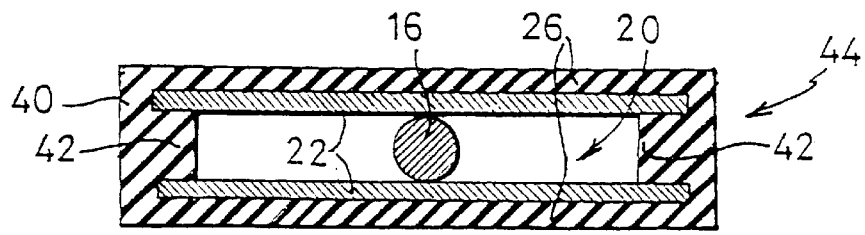
FIG. 7 is a section by a longitudinal and transverse plane of a dampener block with two friction plates.

However, when slide 14 has two friction plates 22, it is possible to provide, as illustrated in FIG. 7, for producing deformable plates 26 associated with these two plates 22 in a single piece, for example by molding. As can be seen in FIG. 7, the two deformable plates 26 are connected, at each of their longitudinal ends, by cross pieces 40 produced integrally with them, cross pieces 40 having lug 42 that extends longitudinally in such a way as to be held between the two internal surfaces 24 of plates 22, in order to determine the spacing of plates 22 and to ensure their attachment. Dampener block 44 formed by the two deformable plates 26 and the two cross pieces 40 can be molded around two friction plates 22.

Figure 8:
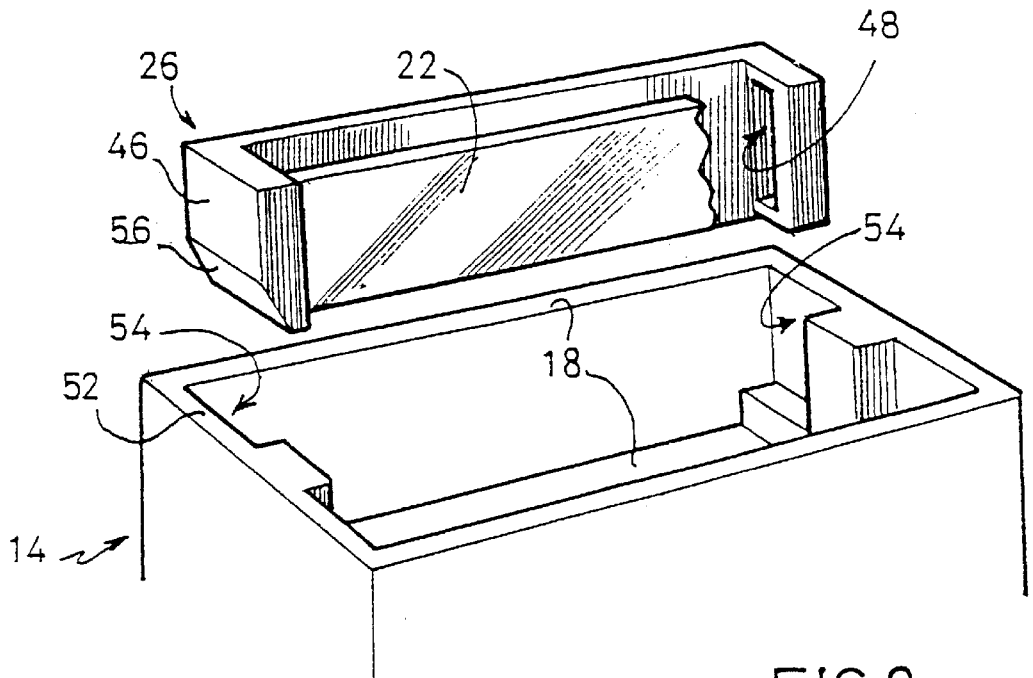
FIG. 8 is a diagrammatic oblique view illustrating another form of slide according to the invention.

Illustrated in FIG. 8 is another embodiment of the invention in which deformable plate 26 has, at each of its longitudinal ends, caps 46 which extend transversely towards the interior from interior surface 28 of plate 26. In each cap 46, housing 48 is formed, which is open longitudinally in the direction of the other cap 46. The two housings 48 are intended for holding the longitudinal ends of friction plate 22, which can be successively engaged in the two housings by deformation of deformable element 26. Once the two ends of plate 22 are held in housings 48, deformable plate 26 and plate 22 are connected together.

Further illustrated in this FIG. 8 is a particular embodiment of stationary structure 50 of slide 14. As can be seen in the figure, the two walls 18 are connected transversely at their longitudinal ends by transverse walls 52. Provided in each wall 52 are spaces 54, each intended to hold one of caps 46 of deformable element 26.

The slide illustrated comprises two friction plates 22 and therefore two deformable plates 26, each wall 52 therefore has two spaces 54. Spaces 54 have the same transverse width as caps 46 and the same dimension in the vertical direction in such a way as to determine very precisely the position of the whole formed by deformable plate 26 and friction plate 22.

Furthermore, it is possible to see that one of caps 46 of deformable element 26 has angled corner 56 which creates a lack of symmetry. The corresponding space 54 of course itself also has a complementary angled corner (not represented) so that the associated angled corners allow deformable element 26 and friction plate 22 to be mounted only in a single direction in order to ensure that the assembly thus formed is rightly positioned so that plate 22 is transversely toward the interior and deformable plate 26 is transversely toward the exterior.

In the two embodiments of the invention illustrated in FIGS. 7 and 8, one observes that the friction plate(s) can be mounted in a slide without any contact between the plate and the stationary structure of the slide. This arrangement is particularly advantageous because it avoids any transmission of vibration from one to the other.

Of course, the invention is not limited to the embodiments described, and the expert in the field will be able very simply to deduce other embodiments, particularly of the deformable plates, by simple combination of the characteristics of the different embodiments illustrated.

What is claimed is:

1. A motor vehicle wiper system comprising:

a drive shaft rotatable around an axis (A1);

a motor for rotating the drive shaft;

means for varying the orientation of axis (A1) of the drive shaft;

an external section of the drive shaft held between two internal surfaces of a slide, the internal surfaces parallel and facing one another;

a slide wherein at least one of the internal surfaces of the slide has a friction plate whose external surface cooperates with a deformable means interposed between the friction plate and a stationary wall of the slide for permitting displacement of the friction plate along a transverse direction perpendicular to the plane of the plate, the external section held in the slide, the deformable means acting on the plate so that the external section rests simultaneously against the two opposite internal surfaces of the slide.

2. The wiper system according to claim 1, wherein the deformable means consists of a plate made of an elastomer material whose interior surface rests against an external surface of the plate and whose exterior surface rests against the wall of the slide.

3. The wiper system according to claim 2, wherein the deformable plate has raised protuberances on at least one of its surfaces.

4. The wiper system according to claim 3, wherein the raised protuberances are in the form of bars.

5. The wiper system according to claim 4, wherein the bars are in the form of wavy bars.

6. The wiper system according to claim 3, wherein the raised protuberances are in the form of stubs.

7. The wiper system according to claim 6, wherein the stubs are generally cylindrical and solid.

8. The wiper system according to claim 3, wherein the deformable plate has, on its surface opposite that which bears the protuberances, recesses made to correspond with the protuberances.

9. The wiper system according to claim 3, wherein the protuberances are arranged on the interior surface of the deformable plate.

10. The wiper system according to claim 3, wherein the protuberances are arranged on the exterior surface of the deformable plate.

11. The wiper system according to claim 2, wherein the deformable plate is an extruded plate.

12. The wiper system according to claim 2, wherein the deformable plate is a molded plate.

13. The wiper system according to claim 12, wherein the deformable plate is unitarily molded onto the friction plate.

14. The wiper system according to claim 2, wherein the deformable plate is adhesively joined to the friction plate.

15. The wiper system according to claim 2, wherein the deformable plate has, at two longitudinal ends, caps that extend transversely towards the interior from the interior surface of the plate and each of which delimits a housing, the two housings being open longitudinally in the direction of one another so that each can hold a corresponding longitudinal end of the friction plate.

16. The wiper system according to claim 1, wherein the slide has two opposite stationary walls, two friction plates, and two deformable elements that are interposed respectively between one of the plates and one of the walls, the external section of the shaft being held tightly between the two friction plates.

17. The wiper system according to claim 16, wherein the two deformable elements are coupled as a single piece dampener block.

18. The wiper system according to claim 17, wherein the dampener block is molded around the two friction plates.

* * * * *